Sept. 29, 1964  W. M. LAFFERTY  3,151,195
METHOD AND APPARATUS FOR MAKING PIPE
JOINT SEALING STRUCTURES
Filed Nov. 14, 1961

INVENTOR.
BY WYLIE M. LAFFERTY

ATTORNEYS

United States Patent Office 3,151,195
Patented Sept. 29, 1964

3,151,195
METHOD AND APPARATUS FOR MAKING PIPE JOINT SEALING STRUCTURES
Wylie M. Lafferty, 310 Church St. SW.,
New Philadelphia, Ohio
Filed Nov. 14, 1961, Ser. No. 152,285
9 Claims. (Cl. 264—262)

My invention relates to the method and apparatus for mounting a female sealing element in the bell of a pipe to be coupled with the spigot of another pipe aligned therewith.

An object of my invention is to provide an improved method for concentrically positioning a gasket of rubber-like material within the bell of a pipe.

Another object is the provision for so positioning and supporting an internally ribbed gasket as to firmly hold the gasket in position while being anchored in the bell by a settable moldable material introduced into the bell around the gasket.

Another object is the provision for supporting a die complementarily interengaged with an internally ribbed rubber gasket to firmly support the gasket during the mounting operation and for the removal of the supporting die after the gasket is firmly mounted in position.

Another object is the provision of an improved method for providing a novel sealing arrangement in the bell of a pipe.

Another object is the provision of a novel apparatus for mounting a gasket of rubber-like material in the bell of a pipe, which gasket has ribs extending radially inwardly therefrom.

Another object is the provision of apparatus designed for accomplishing the problem of mounting a new and unique sealing gasket in the bell of a pipe adapted to receive the spigot of another pipe.

Figure 1:
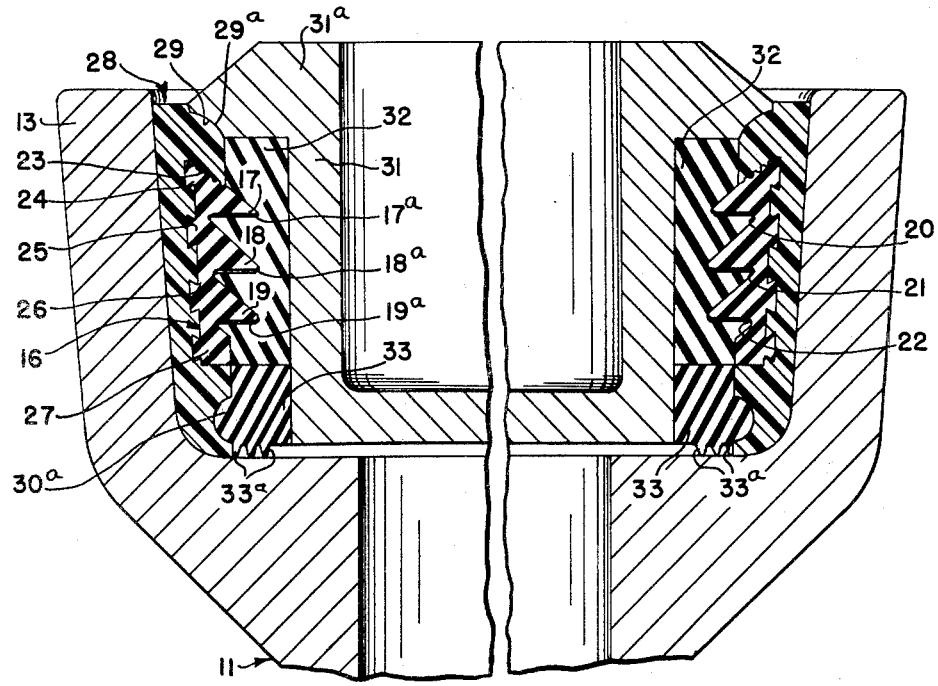
Figure 2:
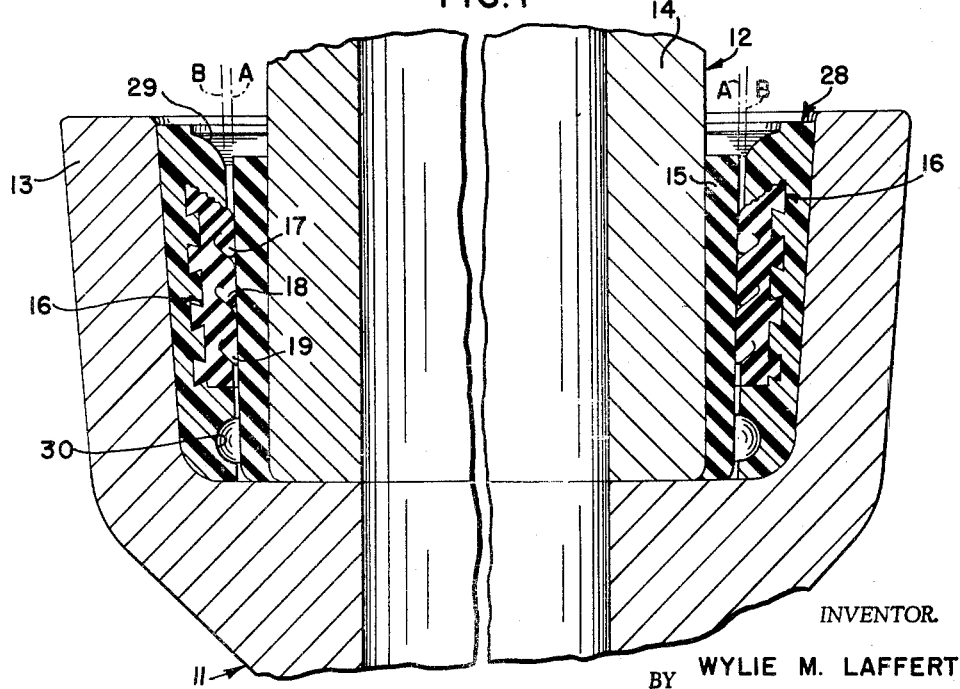

Other objects and a fuller understanding of the invention may be had by referring to the following description and claims, taken in conjunction with the accompanying drawings, in which:

FIGURE 1 is a partial longitudinal sectional view through the bell of a pipe showing the elements of the sealing structure together with the apparatus for mounting the same in the bell; and FIGURE 2 is a view of the finished sealing arrangement in the bell and showing the disposition of the parts upon insertion of a spigot within the bell.

A pipe denoted generally by the reference character 11 has a bell 13 with generally cylindrical inner walls but tapered inwardly from the entrance thereof. A spigot 14 of an axially aligned pipe 12 is adapted to be inserted within the bell 13 to the relative position shown in FIGURE 2. A collar 15 of polyester resin or other suitable hardenable material is molded to and adhered to the spigot 14 so that the spigot 14 with the collar thereon as a unit may be inserted into the bell.

An annular gasket denoted generally by the reference character 16 is mounted in the bell concentric with the axis of the pipe 11 in such position as to sealingly engage the collar 15 on the spigot 14. This gasket of elastomeric material is preferably made of rubber, synthetic rubber, or other appropriate resiliently yieldable material. It has a hardness on the order of 45 to 55 durometer measurement.

It is to be noted that the gasket 16 has three radially inwardly directed ribs 17, 18 and 19. The respective ribs have inclined sides extending inwardly of the bell and disposed on the order of 40° to 50° to the axis of the bell. Each rib also has an abrupt side disposed at an angle on the order of 85° to 95° to the axis of the bell. Adjacent each rib and on its abrupt side is an annular groove. The annular groove 20 is adjacent the rib 17; the annular groove 21 is adjacent the rib 18; and the annular groove 22 is adjacent the rib 19, as illustrated. At the front end of the gasket, that is, closest to the entrance of the bell 13, the gasket is provided with annular serrations 23. The outer wall of the gasket 16 is provided with four spaced annular tenons 24, 25, 26 and 27.

An anchoring element, denoted generally by the reference character 28, made of appropriate settable material is mounted around the gasket 16 so as to hold it firmly in concentric position and spaced from the inner wall of the bell 13. This anchoring element 28 may be made of polyester resin, or a cement, or of other material which may be introduced while plastic and hardened in its position in the bell. The hardness of the anchoring element 28 and the hardness of the collar 15 are on the order of 80 to 95 durometer measurement.

Adjacent the entrance of the bell, the anchoring element 28 has a curved wall 29 which facilitates the entrance of the collared spigot therein. Adjacent the innermost end of the anchoring element 28 and near the bottom wall of the bell, there is an annular recess 30 providing for accommodating dirt, sand or other debris which might be inadvertently within the bell upon insertion of the spigot.

There is provided for mounting the basket 16 within the bell a steel mandrel or rigid form 31 which has a cylindrical outer surface and a flange portion 31a at one end thereof. The flange portion 31a has a curved shoulder 29a complementing the contour of the curved wall 29 so that the material of the anchoring element 28 conforms to the curved shoulder 29a. There is also provided an annular die member 32 of rubber or rubber-like material. The annular die member 32 has an inner annular wall conforming to the outer cylindrical wall of the rigid form 31, and is so dimensioned as to snugly embrace the cylindrical wall of the rigid form 31. The annular die member 32 may be made of a suitable elastomeric material. It has a firmness and hardness sufficient to support and embrace the ribs 17, 18 and 19 and at the same time is sufficiently resiliently yieldable to be collapsed upon removal of the rigid form 31 from the bell. As seen in the drawing, the outer wall of the annular die member 32 has annular recesses 17a, 18a and 19a formed therein for accommodating the respective ribs 17, 18 and 19 of the gasket 16. By reason of the close complementary shape of these recesses 17a, 18a and 19a, the ribs 17, 18 and 19 are firmly held and secured in position by the annular die member 32.

In axial alignment with the annular die member 32 is a sealing ring or second annular die 33 also made of an appropriate elastomeric material. This ring 33 has an annular bulge 30a extending therearound for forming the complementarily shaped annular recess 30 in the anchoring element 28. Extending from the end of the ring 33 toward the bottom wall of the bell 13 are a plurality of annular beads 33a. These beads 33a are adapted to make sealing contact with the bottom wall of the bell 13 notwithstanding the possible presence of any sand or other fine particles that might be lodging in the bottom of the bell during the assembly operation. They provide a seal between the ring 33 and the bottom of the bell to prevent the material of which the anchoring element 28 is composed from flowing, while in a plastic or flowable condition, inwardly of the pipe past the ring 33.

To mount the gasket 16 in place, the gasket 16 is first interengaged with the annular die 32 while the die 32 is separate from or removed from the rigid form 31. By reason of the resilient yieldability of both the gasket 16 and the first annular die 32, they may be flexed and moved in such a manner that the ribs 17, 18 and 19 of the gasket are consecutively positioned within the recesses 17a, 18a and 19a of the annular die 32. As the die 32 may be readily flexed radially inwardly, the insertion of the ribs in the respective grooves is facilitated. The assembly of gasket 16 and first annular die 32 is then concentrically mounted upon the rigid form 31 and moved along the outer cylindrical surface of the form 31 to abut the shoulder portion 31a. By reason of the snug embrace of the die 32 on the rigid form 31, the assembly is firmly held to the rigid form 31. Thereafter, the ring or second annular die 33 is mounted on the rigid form 31 at the end thereof farthest removed from the flange portion 31a and in close engagement with the end of the first annular die 32. In this position, the annular beads 33a extend a short distance beyond the assembly of rigid form 31, first annular die 32, gasket 16 and ring 33.

The assembly is then inverted and placed within the bell 13 to take the relative positions shown in FIGURE 1. The rigid form 31 is so shifted in the bell as to be in accurate axial alignment with the axis of the pipe 11. This leaves a space between the inner wall of the bell on the one hand and the assembly of rigid form 31, first annular die 32, gasket 16 and ring 33. Into this annular space is introduced an appropriate settable material, such as for example, a polyester resin. This material is hardened to form the anchoring element 28 which accurately positions and anchors the gasket 16 in position notwithstanding any lack of concentricity of the internal wall of the bell 13.

After the material of the anchoring element 28 has hardened, the rigid form 31 is withdrawn from the bell 13 by moving it axially out of the bell. This leaves the first annular die 32 within the bell by reason of the interengagement of the ribs 17, 18 and 19 within a respective annular recess 17a, 18a and 19a. The annular die 32, being resiliently yieldable, is then collapsed, that is, moved radially inward by distorting it from a true circle so as to be free of the protruding ribs 17, 18 and 19. By reason of this distortion and inner movement of the first annular die 32, the first annular die 32 is clear of the ribs 17, 18 and 19 and may then be readily withdrawn from the bell by axially moving it away from the bell.

After the removal of the first annular die 32, then the ring or second annular die 33 is similarly collapsed by distortion and radial inward movement so as to clear the bulge portion 30a from the annular recess 30 formed in the hardened material of the anchoring element 28. This leaves mounted within the bell the gasket 16 firmly held in position by the anchoring element 28.

As is seen in FIGURE 2, the outer wall of the collar 15 on the spigot 14 has a generally cylindrical shape denoted by the reference character A. The inner wall of the anchoring element 28 and a portion of the gasket 16 at its innermost end have a generally cylindrical form denoted by the reference character B. While there is some taper to the shapes A and B, they are sufficiently cylindrical that they may be referred to as cylindrical forms. It is to be noted that the outer wall of the first annular die 32 has a cylindrical shape corresponding to the cylindrical shape B of the hardened anchoring element 28. The difference between the cylindrical shapes A and B is such that there is an annular space therebetween. This provides clearance between the outer wall of the collar 15 and the inner wall of the anchoring element 28 when the spigot 14 is in accurate axial alignment with the bell 13. In this position shown in FIGURE 2, the ribs 17, 18 and 19, being resiliently yieldable, have been flexed downwardly and outwardly so as to fill the adjacent grooves in the gasket as shown in the drawing. This provides a firm support for the collared spigot within the bell. As the deformed ribs are confined within the respective grooves, any additional pressure upon the ribs in one lateral direction tends to cause the rubber-like material to flow circumferentially up around the collared spigot and to expand at a location where the pressure on the ribs is of a lesser degree. This provides for maintaining a good sealing contact between the gasket and the collar notwithstanding lateral displacement of one pipe relative to the other and notwithstanding tilting of one pipe relative to the other.

The apparatus disclosed has been found to be preferred equipment for carrying out the mounting of the gasket in the required manner. The method disclosed has been found to be efficient and to provide for rapid and economical mounting of the gasket in position.

The present disclosure includes that contained in the appended claims, as well as that of the foregoing description.

Although this invention has been described in its preferred form and preferred practice with a certain degree of particularity, it is understood that the present disclosure of the preferred form and practice has been made only by way of example and that numerous changes in the details of construction and the combination and arrangement of parts and steps may be resorted to without departing from the spirit and scope of the invention as hereinafter claimed.

What is claimed is:

1. The method of mounting a gasket of rubber-like material in the bell of a pipe, the gasket having a plurality of annular ribs and grooves formed in its inner wall in alternating arrangement, comprising the steps of providing a rigid form having a cylindrical outer wall and a flange portion extending radially outward from the cylindrical portion, providing a first annular die of rubber-like material having a cylindrical inner wall complementing a first portion of the cylindrical outer wall of the said rigid form, said annular die of rubber-like material having an outer wall complementing the said ribs and grooves of said gasket, providing a second annular die of rubber-like material having a cylindrical inner wall complementing another portion of the cylindrical outer wall of the said rigid form, assembling said gasket and first die to complementarily interengage the ribs and grooves of the gasket with said outer wall of the first die, mounting the said assembly of gasket and first die on said rigid form adjacent said flange portion with a first axial end of the first die abutting said flange portion and with said inner wall of the first die engaging the first portion of the cylindrical outer wall of the rigid form, mounting the said second die on said rigid form adjacent said first die with an opposite axial end of the first die abutting said second die and with the said inner wall of the second die engaging the second portion of the cylindrical outer wall of the rigid form, inserting the rigid form with first and second dies mounted thereon in said bell with said flange portion uppermost and said second die at the bottom of said bell, axially aligning said rigid form and said bell to provide an annular space between the inner wall of the bell and the assembly of rigid form, first die, second die and gasket, filling said annular space with a settable material and permitting it to harden to secure the gasket in position in said bell, axially withdrawing the rigid form from the bell, flexing and stripping the first die from the gasket, and stripping the second die from the hardened settable material.

2. The method of making the female portion of a pipe joint for receiving a spigot in a bell of adjoining pipes, comprising the steps of providing an annular gasket of elastomeric material having a plurality of radially inwardly directed annular ribs, assembling said gasket with an annular die of elastomeric material having an outer wall annularly grooved to complementarily interengage with said ribs for supporting said gasket, mounting said assembly on a rigid form having an outer wall and a shoulder extending therefrom with an axial end of the annular die abutting said shoulder and with the inner wall of said annular die embracing the outer wall of said rigid form to hold said die and gasket in concentric positions about the axis of said rigid form, positioning the rigid form with assembly of annular die and gasket mounted thereon in said bell concentric with the axis thereof, introducing settable material between the inner wall of said bell and outer wall of said gasket and allowing the material to set for concentrically mounting the gasket in said bell, withdrawing the rigid form axially from said bell, collapsing said annular die to separate from the ribs of said gasket, and withdrawing the collapsed annular die from the bell to leave the gasket mounted therein.

3. The method of mounting the female sealing element in the bell of a pipe adapted to couple with the collared spigot of another pipe, comprising the steps of providing an elastomeric annular sealing gasket provided with annular ribs and grooves alternately disposed on its inner wall, said ribs protruding inwardly and said grooves extending outwardly of the reference cylindrical form of the collared spigot to be inserted in the bell, providing an elastomeric annular die provided with annular ribs and grooves alternately disposed on its outer wall substantially complementing the ribs and grooves on said gasket, concentrically positioning said gasket and annular die with the ribs and grooves of one intermeshed with the other to support against displacement the ribs of the gasket by said annular die, providing a rigid form having an outer cylindrical wall and a flange portion extending outwardly from said cylindrical wall, concentrically mounting the intermeshed gasket and annular die on the cylindrical wall of said rigid form and adjacent said flange portion with said annular die embracing the said cylindrical wall and abutting said flange portion, providing a sealing ring and concentrically mounting the sealing ring around said cylindrical wall adjacent and in axial alignment with said annular die, axially positioning said rigid form with parts mounted thereon in said bell of a pipe with said flange portion disposed adjacent the entrance of the bell and said sealing ring adjacent the inner lateral wall of the bell, introducing into the bell around said annular die, gasket and sealing ring and intermediate said flange portion and inner lateral wall of the bell a settable material while in a plastic condition, permitting said settable material to harden, axially withdrawing the rigid form from the bell and outer wall of the annular die and sealing ring, flexing the annular die inwardly of the bell to disengage the ribs of the gasket and to clear the said ribs, withdrawing the annular die from the bell, and withdrawing the sealing ring from the bell.

4. The method of mounting in a pipe bell an annular gasket of rubber-like material having inwardly extending annular ribs on the inner wall thereof, comprising the steps of internally supporting said gasket including said ribs with an annular die of resiliently flexible material having grooves complementarily receiving the ribs of the gasket to hold the same against distortion by first assembling the die and gasket in concentric nested arrangement, internally supporting the said annular die and gasket supported thereby by secondly mounting the assembly of die and gasket concentrically on a rigid form disposed within the assembly, inserting the gasket while thus supported concentrically in a said pipe bell to space the gasket from the inner wall of the bell, interlocking said gasket to said bell, withdrawing first the internal support of said annular die from said bell, flexing and withdrawing the annular die radially inward from said gasket to clear the ribs thereof, and thereafter withdrawing the annular die from the said bell.

5. The method of mounting an annular female sealing element in the bell of a pipe adapted to receive the spigot of another pipe, said female sealing element having a resiliently yieldable rib extending radially therein, comprising, first and prior to placing in said bell, positioning within said female sealing element a resiliently yieldable annular die having an annular groove in its outer wall for complementarily receiving and supporting said rib, secondly and prior to placing in a said bell, positioning within said annular die a cylindrical rigid form to support the annular die against radially inward movement, third positioning the female sealing element while so supported within a said bell concentric with the axis thereof, locking said female sealing element to the walls of said bell, withdrawing the support of said annular die by said rigid form, flexing said annular die inwardly away from said sealing element to clear said rib, and withdrawing said annular die to leave said sealing element locked in said bell.

6. Apparatus for mounting a rubber-like annular gasket in a pipe bell, the gasket having inwardly extending ribs, comprising in combination an annular die having annular grooves in the outer wall thereof for complementarily receiving said ribs, said annular die being yieldably distortable upon being flexed inwardly to clear said ribs, said gasket and annular die being adapted to be assembled in concentric relationship with the said grooves accommodating said ribs, a non-distortable support member for axially abutting and internally supporting the annular die against inward flexing upon insertion of the support member in a said assembly of another die and gasket, and another die mountable on said support member and positionable between the annular die and the inner lateral wall of the bell, the arrangement of gasket, annular die, support member and another die providing that the gasket may be concentrically positioned in a said bell while assembled with the annular die and supported by the support member with said another die positioned in the bell adjacent said lateral wall thereof and settable material while plastic introduced between the gasket and bell wall and outwardly of said another die, and after hardening of the settable material the support member may be first withdrawn from the bell, the annular die may be yieldably distorted to clear the ribs of the gasket to separate from the assembly and withdrawn from the bell and the another die withdrawn from the bell.

7. Apparatus for concentrically anchoring within a bell of a pipe an annular gasket of elastomeric material having internally disposed annular ribs extending radially thereof, comprising first means resiliently deformable and having grooves for receiving said ribs for internally supporting said gasket and embracing said ribs to permit the gasket and first means to be assembled with said ribs accommodated in said grooves and the first means embraced by the gasket, second means relatively rigid and insertable within the assembly of said first means and gasket for axially abutting and for internally supporting said first means in said assembly, and third means for sealing between the second means of said assembly and the bottom wall of said bell, said first, second and third means upon being concentrically positioned in a said bell being adapted to locate said gasket supported on said first means in position to be anchored in said bell.

8. Apparatus for holding a rubber-like internally ribbed annular gasket in position within a pipe bell for anchoring therein by a settable material introduced while plastic between the gasket and wall of the bell, comprising a rubber-like annular die having an external wall formed to interlock with the ribs of the gasket, said annular die being yieldable to be collapsed by radially inward movement thereof whereby the annular die and gasket may be assembled in concentric relationship with the annular die within the gasket and the ribs accommodated by said external wall of the annular die, a cylindrical form insertable within said annular die of said assembly to provide internal support thereto, said form having a shoulder for axially abutting and end of said die, and a sealing ring separate from said assembly positionable between the annular die of said assembly and the bottom wall of the bell to block movement of said settable material while plastic radially inward of the pipe, said sealing ring having an annular bulge on the outer wall thereof for forming an annular recess in said settable material, said annular die and cylindrical form being adapted to hold a said gasket concentrically within said bell while settable material is introduced between the bell wall and gasket and between the gasket and said bottom wall of the bell.

9. Apparatus for holding a rubber-like internally ribbed annular gasket in position within a pipe bell for anchoring therein by a settable material introduced while plastic between the gasket and wall of the bell, comprising a rubber-like annular die having a grooved external wall formed complementarily to interlock with the ribs of the gasket, said annular die being yieldable to be collapsed by radially inward movement thereof whereby the annular die may be assembled with the annular die nested concentrically within the gasket and the ribs of the gasket accommodated by said grooved external wall, and a rigid cylindrical form insertable within the said assembly and engageable with said annular die to provide internal support thereto, said form having a shoulder axially abuttable with said annular die to locate the same, said annular die and cylindrical form being adapted to hold a said gasket assembled with the annular die concentrically within said bell while settable material is introduced between the bell wall and gasket and between the gasket and said bottom wall of the bell.

References Cited in the file of this patent

UNITED STATES PATENTS

| | | |
|---|---|---|
| 2,766,054 | Everhart | Oct. 9, 1956 |
| 2,889,582 | Cooper | June 9, 1959 |
| 2,955,322 | Hite | Oct. 11, 1960 |

FOREIGN PATENTS

| | | |
|---|---|---|
| 1,264,634 | France | May 15, 1961 |